US008403281B2

(12) United States Patent
Burtscher et al.

(10) Patent No.: US 8,403,281 B2
(45) Date of Patent: Mar. 26, 2013

(54) MOUNTING DEVICE FOR SECURING PLATE-SHAPED ELEMENTS

(75) Inventors: Norbert Burtscher, Thueringen (AT); Markus Frommelt, Schaan (LI)

(73) Assignee: Hilti Aktiengesellschaft, Schaan (LI)

( * ) Notice: Subject to any disclaimer, the term of this patent is extended or adjusted under 35 U.S.C. 154(b) by 502 days.

(21) Appl. No.: 12/322,089

(22) Filed: Jan. 28, 2009

(65) Prior Publication Data
US 2009/0200443 A1 Aug. 13, 2009

(30) Foreign Application Priority Data

Feb. 13, 2008 (DE) .......................... 10 2008 000 293

(51) Int. Cl.
*A47B 96/06* (2006.01)
(52) U.S. Cl. .............. 248/229.24; 248/229.22
(58) Field of Classification Search .............. 248/229.2, 248/229.24, 229.14, 229.1, 231.41, 231.61, 248/227.2, 229.22, 65, 70, 72, 74.1; 269/3, 269/6, 71; 29/243.55; 24/458, 486, 525, 24/569
See application file for complete search history.

(56) References Cited

U.S. PATENT DOCUMENTS

| | | | | |
|---|---|---|---|---|
| 2,439,623 A * | 4/1948 | Howells | ........................ | 224/570 |
| 2,840,092 A * | 6/1958 | Hill | ................................ | 135/118 |
| 3,397,431 A * | 8/1968 | Walker | .......................... | 403/344 |
| 4,032,100 A * | 6/1977 | Kahn | ............................. | 248/211 |
| 4,431,152 A * | 2/1984 | Reed, Jr. | ......................... | 248/65 |
| 6,370,741 B1 * | 4/2002 | Lu | .................................... | 24/523 |
| 6,471,171 B1 * | 10/2002 | VanderVelde | ............ | 248/229.12 |
| 6,618,905 B2 * | 9/2003 | Warashina et al. | ............. | 16/426 |
| 6,883,761 B2 * | 4/2005 | Boon et al. | .................... | 248/74.1 |
| 6,938,865 B1 * | 9/2005 | Day | .......................... | 248/229.14 |
| 7,546,993 B1 * | 6/2009 | Walker | ....................... | 248/218.4 |
| 7,896,436 B2 * | 3/2011 | Kurrasch et al. | ........... | 297/217.3 |
| 2004/0046098 A1* | 3/2004 | Painchaud | .................... | 248/534 |
| 2010/0288897 A1* | 11/2010 | Chang | ...................... | 248/229.22 |

FOREIGN PATENT DOCUMENTS

DE 102 33 973 A1 2/2004

* cited by examiner

*Primary Examiner* — Alfred J Wujciak
(74) *Attorney, Agent, or Firm* — Abelman, Frayne & Schwab

(57) ABSTRACT

A mounting device for securing plate-shaped elements (5) on a mounting rail (6) includes first (12; 52; 72) and second holding members (17; 57; 77) forming, together a space (16; 42) for receiving a plate-shaped element (5), a fastening member (27; 60) extending through the first (12; 52; 72) and the second (17; 57; 77) holding member and connectable with an anchoring element (23) provided on the mounting rail (6) for securing the mounting device (11; 41; 51; 71) on the mounting rail (6), and at least one resilient element (32; 46; 62; 92) provided between the first holding member (12; 52; 72), which is displaceable relative to the second holding member, and the second holding member (17; 57; 77) for spacing the first and second holding members (12, 17; 52, 57; 72, 77) from each other.

3 Claims, 3 Drawing Sheets

MOUNTING DEVICE FOR SECURING PLATE-SHAPED ELEMENTS

BACKGROUND OF THE INVENTION

1. Field of the Invention

The present invention relates to a mounting device for securing plate-shaped elements on a mounting rail and including a first holding member, a second holding member forming, together with the first holding member, a space for receiving a plate-shaped element, with the first holding member being displaceable relative to the second holding member, and a fastening member extending through the first holding member and the second holding member and connectable with an anchoring element provided on the mounting rail for securing the mounting device on the mounting rail.

2. Description of the Prior Art

For mounting plate-shaped elements such as solar panels of solar plants on roof surfaces, in particular after a structure has been erected, there are provided support systems formed of mounting rails. The mounting systems or rails support separate plate-shaped elements, e.g., solar panels at a distance from a roof cover formed of, e.g., tiles. The separate plate-shaped elements are secured on the support system with separate mounting devices. The mounting rails themselves have anchoring elements with which the shaft of a fastening member is connected for securing the mounting device on the rail. E.g., the fastening member can have a threaded section that engages a counter-thread provided in the mounting rail as an anchoring element.

German Publication DE 102 33 973 A1 discloses a mounting device for securing plate-shaped elements in form of solar panels on a C-shaped rail having a longitudinally extending groove. The mounting device includes first and second holding members, a fastening member extending through the first and second holding members, and a rear gripping member insertable in the receiving groove and rotatable therein. The rear gripping member has anchoring means that forms the anchoring means of the mounting rail. The anchoring means, which is provided in the bottom plate, is formed as a counter-thread which is engaged by the threaded section with which the fastening member is provided. The first holding member is displaceable relative to the second holding member. Upon locking of the mounting device, the solar panel is clamped between the first and second holding members, with the mounting device being simultaneously secured on the mounting rail. A spacer sleeve is provided between the first and second holding members and insures a minimal spacing between the holding members and prevents, in the locking position of the mounting device, application of a two high pressure to the solar panel in a region of retention of the solar panel.

The drawback of the above-described mounting device consists in that during mounting of the device on a mounting rail, the first and second holding members tend to automatically adjust themselves to a minimal distance therebetween predetermined by the spacer sleeve. This makes mounting of a solar panel more difficult because its edge should be inserted in several mounting devices. In particular, with large surfaces of the solar panels and, e.g., when two adjacent to each other solar panels need to be secured with a single mounting device, the mounting of the solar panels is time-consuming and expensive. In addition, such solar panels are often mounted on inclined roofs, so that simplicity of mounting is an essential requirement the user requests.

Accordingly, an object of the present invention is to provide a mounting device for securing plate-shaped elements on a mounting rail provided with a receiving groove, which mounting device provides for an easy mounting and securing of the plate-shaped elements.

SUMMARY OF THE INVENTION

This and other objects of the present invention, which will become apparent hereinafter, are achieved by providing at least one resilient element between the first holding member and the second holding member for spacing the first and second holding members from each other.

The at least one resilient element presses the first holding member and the second holding member away from each other, which insures a minimal distance therebetween in the release condition of the mounting device. Thus, the receiving space between the two holding members has an adequate height for a correspondingly formed plate-shaped element, and the plate-shaped element, e.g., a solar panel can be conveniently inserted in the receiving space and secured on the mounting rail with the mounting device. Separate parts or elements of the mounting device are advantageously connected with each other without a possibility of being lost.

Upon locking of the mounting device, the at least one resilient element is compressed between the first and second holding members, so that the edge of the plate-shaped element inserted in the receiving space is clamped between the two holding members at least in some regions.

Advantageously, there are provided, on the adjacent, to each other, sides of the two holding members which come into contact with the plate-shaped element upon locking of the mounting device, elastic pads. The elastic pads prevent contact of the rigid regions of the holding members with the edge region of the plate-shaped element. Thereby, damage of the plate-shaped element, which might have been caused by securing of the plate-shaped element, is prevented.

The mounting device is formed either two-sided, with two, extending parallel to each other, receiving spaces for two plate-shaped elements arranged next to each other, or as an end mounting device, with a single receiving space for a plate-shaped element.

Advantageously, the mounting device has a rear gripping member with an anchoring element for the fastening member. This provides for a simple and rapid mounting of the mounting device in a receiving groove of the mounting rail. The fastening member advantageously has a shaft that advantageously is provided with a threaded section at least in one region. The threaded section is engageable with a counter-thread provided in the rear gripping member as an anchoring element. The mounting device is available to the user advantageously in pre-assembled condition. The rear gripping member is advantageously connected with the shaft of the fastening member without a possibility of rotation relative thereto and further advantageously releasably. The rear gripping member and, e.g., the opposite end of the fastening member limit the maximal displacement of the two holding members toward each other.

Advantageously, the at least one resilient element is formed as an easily compressible elastomeric body that can expand to a sufficiently large predetermined mass in its expanded condition. Alternatively, the at least one resilient element can be formed of sponge rubber or neoprene, or as a spring formed of metal or plastic material, e.g., in form of a plate, spiral or helical spring.

Advantageously, at least one first guide web projects from a side of the first holding member adjacent to the second holding member and at least one second guide web projects from a side of the second holding member adjacent to the first holding member. The first and second guide webs overlap each other and extend in opposite directions toward each other. As a result, the two holding members can be displaced relative to each other. Simultaneously, both the first holding member and the second holding member are secured against rotation, e.g., about a longitudinal axis of the fastening member. This insures that the holding members are always aligned parallel to the edges of the plate-shaped element during the entire mounting process of the plate-shaped element. Thereby, the costs of mounting of plate-shaped elements are noticeably reduced because no alignment is necessary during or after locking of the mounting device.

Advantageously, the at least resilient element is provided between one of the free edges or a free end side of a guide web and the opposite holding member. This insures a simple manufacturing of the mounting device and, at the same time, makes it highly assembly-friendly.

Advantageously, at least one spacer is provided between the first and second holding members for insuring a minimal distance therebetween. During locking of the mounting device, the first holding member and the second holding member abut the spacer. Thereby, with a mounting device selected in accordance with the thickness of the plate-shaped element, the spacer element limits the maximal surface pressure on the secured plate-shaped.

Advantageously, the spacer is formed of several parts. E.g., the spacer can be formed of spacing washers similar to a flat washer and through which the shaft of the fastening member is extendable. The shaft insures that the spacing washers will remain in their position in the mounting device.

According to an alternative embodiment, a free edge or a free end surface of at least one of the guide webs forms a stop for limiting displacement of the first holding member relative to the second holding member. The at least one resilient element is provided adjacent to the stop-forming guide web. Upon tightening of the fastening member, the resilient element is compressed until the corresponding edge or the end surface of the stop-forming guide web engages the opposite holding member. Alternatively, the stop-forming guide web has spaces in which the at least one resilient element can extend upon tightening of the fastening member.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show.

In the drawings, the same elements are designated with the same reference numerals.

DETAILED DESCRIPTION OF THE PREFERRED EMBODIMENTS

Figure 1:
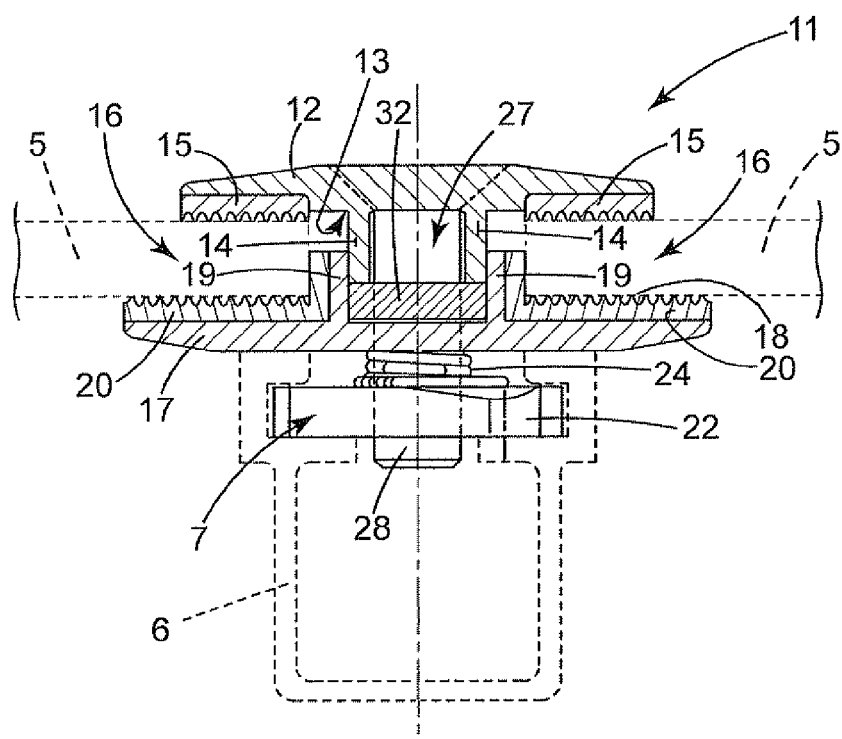
FIG. 1 a cross-sectional view of a first embodiment of a mounting device according to the present invention in a locked condition.
Figure 2:
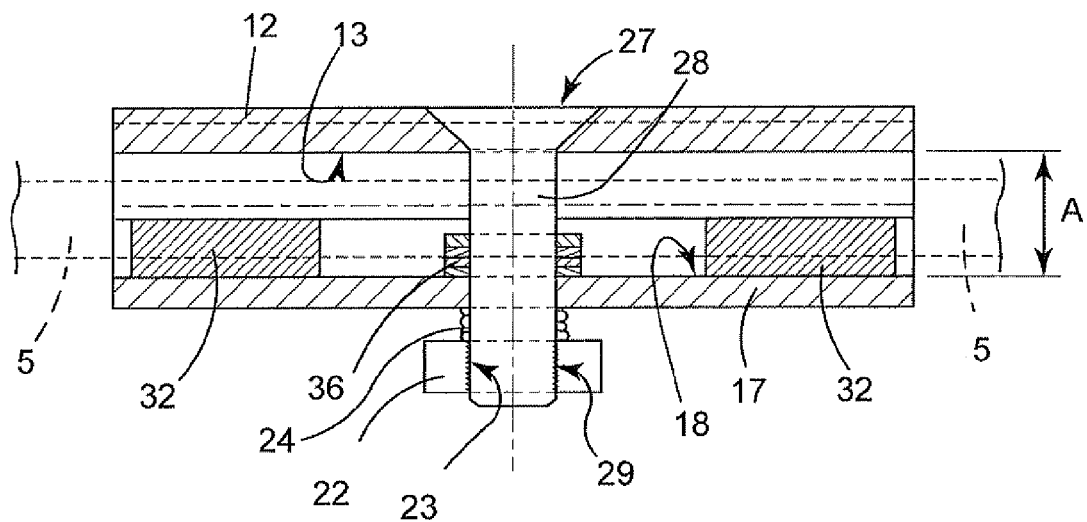
FIG. 2 a longitudinal cross-sectional view of the mounting device shown in FIG. 1 in a release condition.

A mounting device 11 according to the present invention, which is shown in FIGS. 1-2, is formed as a central clamp for securing of plate-shaped elements 5, such as solar panels, in a receiving groove 7 of a mounting rail 6 that serves as a support element for the plate-shaped elements 5. The mounting device 11 includes a first holding member 12 that is used as a holding-down member for holding a plate-shaped element 5, a second holding member 17 that is used as a support member for the plate-shaped panel 5, a rear gripping member 22 insertable into receiving groove 7 of the mounting rail 6 and rotatable therein, and a fastening member 27 having a shaft 28. The shaft 28 of the fastening member 27 extends through the first and second holding members 12 and 17 and engages with a threaded section 29, which is formed in a region of the shaft 28, an inner thread provided in the rear gripping member 22 and forming an anchoring element of the mounting rail 6. Between the first holding member 12 and the second holding member 17, there are formed two receiving spaces 16 for receiving the plate-shaped elements 5.

Two first guide webs 14 project from a side 13 of the first holding member 12 adjacent to the second holding member 17, and two second guide webs 19 project from a side 18 of the second holding member 17 adjacent to the first holding member 12. The first guide webs 14 and the second guide webs 19 overlap each other so that upon the first and second holding members 12 and 17 being displaced relative to each other, the guide webs 14 and 19 are displaced in opposite directions.

Between the first holding member 12 and the second holding member 17, there are provided two, spaced from each other elastomeric bodies which are formed as resilient elements 32. The resilient elements 32 insure that a minimum distance A is maintained between the first holding member 12 and the second holding member 17 or that an adequate height of the receiving space 16 is provided in the release condition of the mounting device 11, which insures an easy insertion of the edges of a plate-shaped element 5 into the receiving space 16 and, thus, an easy mounting. The resilient elements 32 are provided between free edges of the first guide webs 14 of the first holding member 12 and the second holding member 17.

For limiting the displacement of the first holding member 12 and the second holding member 17 relative to each other, there is provided, on the shaft 28 of the fastening member 27 a spacer 36 that surrounds the shaft 28. The spacer 36 is formed of several parts formed as spacing washers which are provided dependent on the thickness of the to-be-secured plate-shaped elements 5.

In order to prevent damage of the plate-shaped elements 5, in the locking condition of the mounting device 11, by edges of the rigid regions of the first holding member 12 and the second holding member 17, elastic pads 15 and 20 are provided on the respective rigid regions of the first and second holding members 12 and 17, respectively. The elastic pads 20 are pulled up along second guide webs 19 of the second holding member 17 and form additionally an elastic support for the plate-shaped element 5 in a direction transverse to the locking direction of the mounting device 11 or transverse to the longitudinal axis of the fastening element 27.

For an easy mounting of the mounting device 11 on the mounting rail 6, preferably, the rear gripping member 22 is arranged on the fastening member 27 without a possibility of rotation relative thereto. Between the rear gripping member 22 and the second holding member 17, there is further provided a spring 24 connected with both the holding member 17 and the rear gripping member 22. The spring 24 biases the rear gripping member 22 in alignment with the second holding member 17, so that the rear gripping member 22 engages from behind the limiting edges of the receiving groove 7 in a condition in which the rear gripping member 22 is inserted into the receiving groove 7. The rear gripping member 22 has, in plan view, a rectangular shape and has a short extent (see FIG. 2) and a long extent (FIG. 1). The short extent is so selected that the rear gripping member 22 can be inserted in the receiving groove 7 of the mounting rail 6 at an any arbitrary point. The long extend is so selected that the rear gripping member 22 engages the edges of the receiving groove 7 of the mounting rail 6 in a corresponding direction.

For securing a plate-shaped element 5 on the mounting rail 6, firstly, the rear gripping member 22 is inserted in the receiving groove 7 of the mounting rail 6, and the mounting device 11 is rotated until it is aligned so that it can receive the edges of the plate-shaped element 5. With the inserted into the mounting rail 6, bottom plate 22 which has a counter-thread (inner thread) for the threaded section 29 provided on the shaft 28 of the fastening member 27, there is provided, in the mounting rail 6, the anchoring element 23 that cooperates with the fastening member 27, for securing the mounting device 11 on the mounting rail 6.

The resilient elements 32 insure a sufficient distance between the first holding member 12 and the second holding member 17 for insertion of edges of the plate-shaped element 5 in the receiving space 16. When the spacer 36 is selected in accordance with the thickness of the to-be-secured plate-shaped element 5, it is insured that the effective surface pressure applied to the plate-shaped element 5 does not exceed a predetermined maximum value in the locking position of the mounting device 11.

After the insertion of edges of the plate-shaped element 5 in the receiving space 16, the mounting device 11 is locked with a fastening member 27, with the first holding member 12 and the second holding member 17 being displaced relative to each other and with the edge region of the plate-shaped element 5 being clamped between the first and second holding members 12 and 17. Simultaneously, the rear gripping member is displaced, pulled-up, toward the second holding member 17, whereby the mounting device 11 become secure to the mounting rail 6.

Instead of a rear gripping member with an anchoring element, the mounting rail itself an include anchoring means for a correspondingly formed fastening member for securing the mounting device on the mounting rail. The anchoring means can form a component of the mounting rail, e.g., be formed integrally therewith, or be provided on a separate element that, if needed, can be provided on or in the mounting rail.

Figure 3:
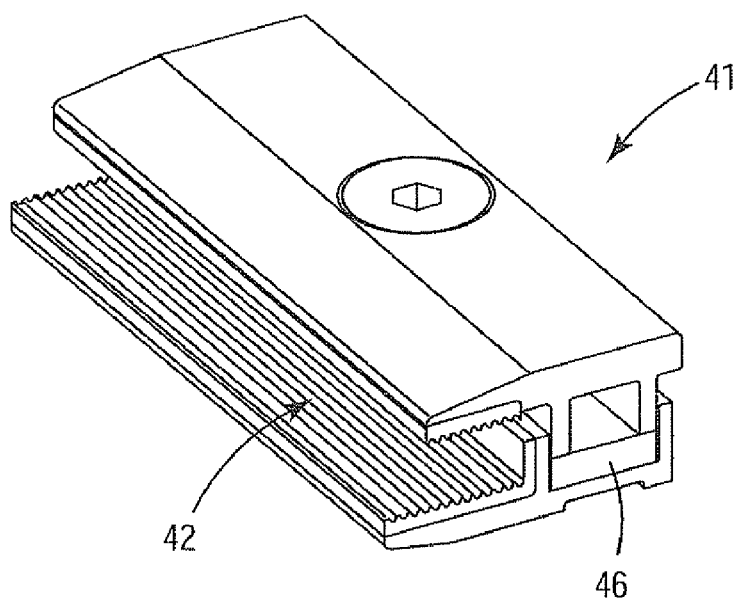
FIG. 3 a perspective view of a second embodiment of a mounting device according to the present invention.

In FIG. 3, the mounting device 41 is formed as an end receptacle with a single receiving space for the edges of a plate-shaped element (not shown). The resilient elements 46, which are shown here, are formed as cuboids-shaped bodies of foamed rubber. In all other aspects, the construction of the mounting device 41 essentially corresponds to the construction of the above-described mounting device 11.

Figure 4:
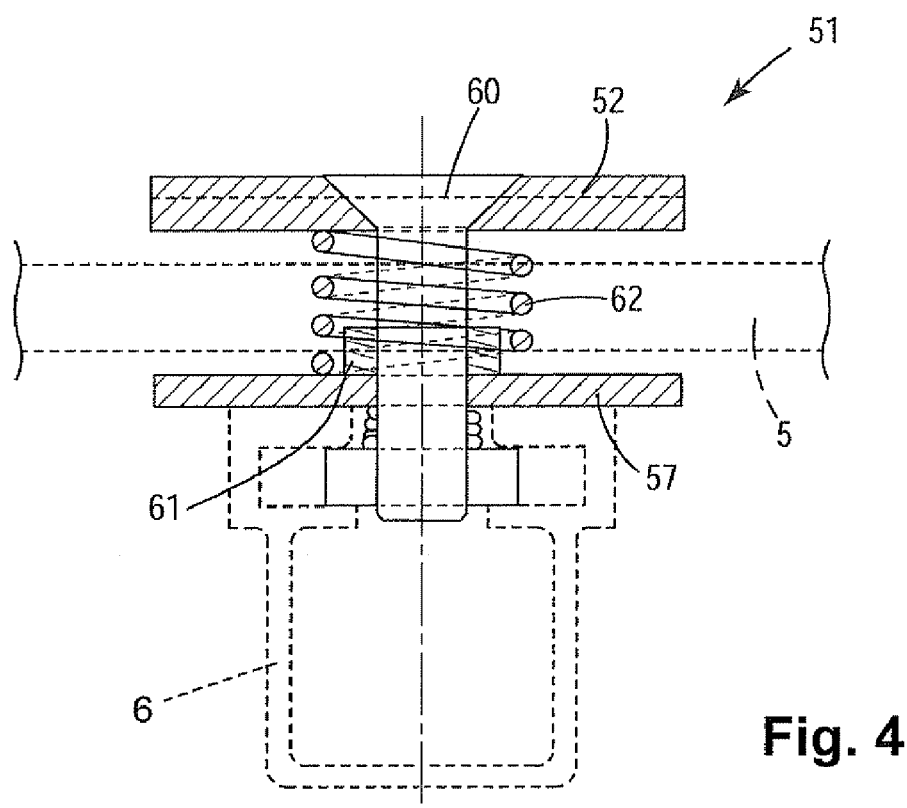
FIG. 4 a longitudinal cross-sectional view of a third embodiment of a mounting device according to the present invention in a release condition.

FIG. 4 shows a mounting device 51 that represents an alternative to the mounting device 11 for securing of plate-shaped elements 5 in a receiving groove of a mounting rail 6 that serves as a support element for the plate-shaped elements 5. The mounting device 51 has resilient elements 62 in form of helical springs formed of spring steel which are arranged between first and second holding parts 52 and 57. The resilient element 62 surrounds a one-piece, sleeve-shaped spacer 61 that surrounds the fastening member 60. The holding members 52 and 57 are essentially plate-shaped and have no projecting therefrom, adjacent to each other, guide webs.

Figure 5:
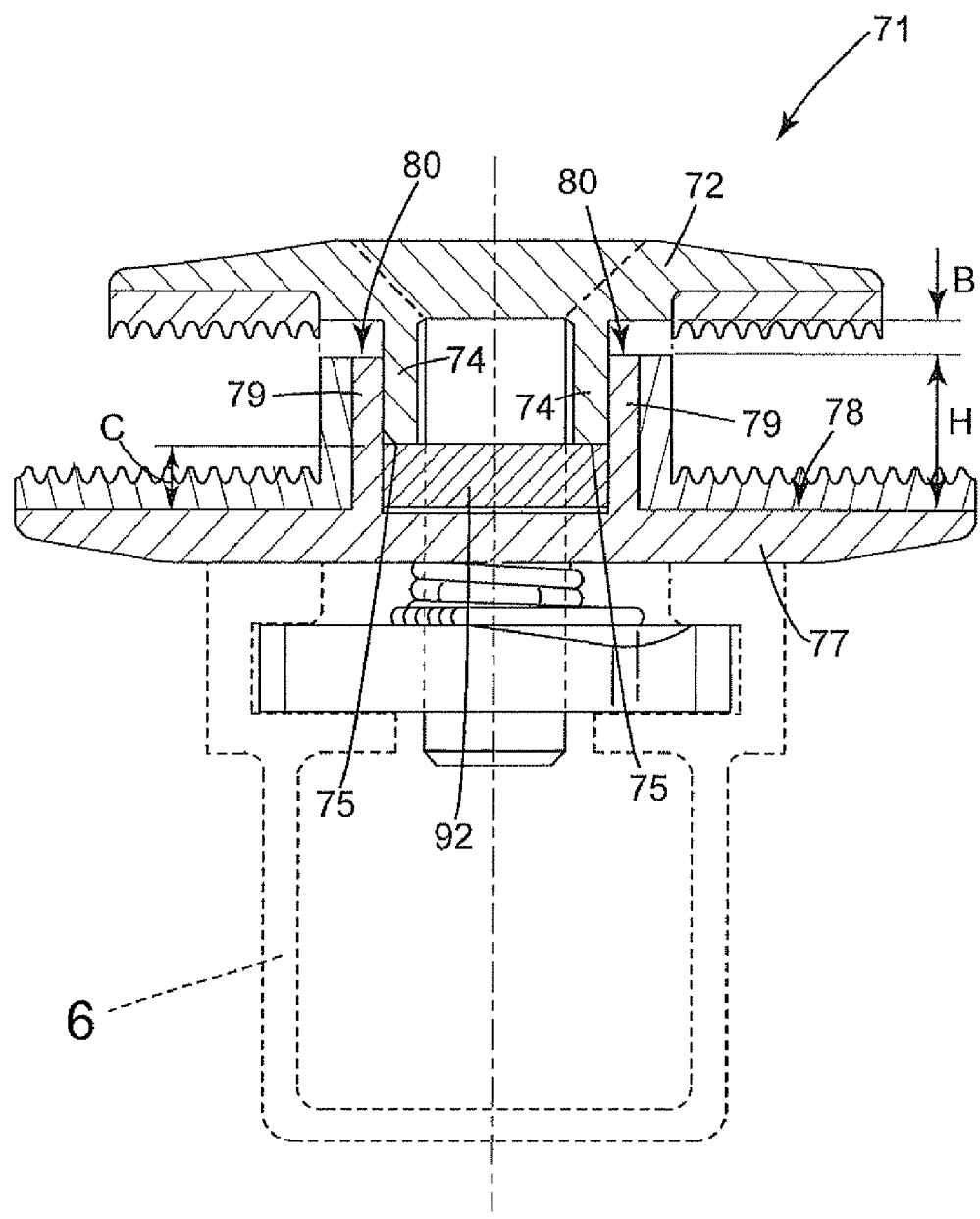
FIG. 5 a cross-sectional view of a fourth embodiment of a mounting device according to the present invention in a release condition.

FIG. 5 shows a mounting device 71 in form of a central clamp and which forms another alternative to the mounting device 11 for securing of plate-shaped elements 5 (see FIG. 1) in a receiving groove of a mounting rail 6 that serves as a support element for the plate-shaped elements 5. In the mounting device 71, the second holding member 77 has two second guide webs 79 projecting from its side 18 and having a height H. The height H of the second guide webs 79 is greater than a corresponding height of the first guide webs 74 projecting from the first holding member 72. In a release condition of the mounting device 71, the distance B between the free edge 80, or of the free end surface of the second guide web 79 and the opposite surface of the first holding member 72 is smaller than the distance C between the free edge 75 or the free end surface of the first guide web 74 to the opposite surface of the second holding member 77. The free edge 80 of the second guide webs 79 forms a stop for limiting the displacement of the first holding part 72 relative to the second holding member 77. A resilient element 92 is provided between free edges 75 of the first guide webs 74 and the opposite second holding member 77. Upon locking of the mounting device 71, the resilient element 92 is compressed until the free edges 80 of the second guide webs 79 abut the corresponding surface of the first holding member 72. Thereby, a further displacement of the first holding member 72 relative to the second holding member 77.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A mounting device for securing plate-shaped elements (5) on a mounting rail (6), the mounting device comprising:
 a first holding member (12; 52; 72);
 a second holding member (17; 57; 77) forming, together with the first holding member (15; 52; 72), a space (16; 42) for receiving a plate-shaped element (5), the first holding member (12; 52; 72) being displaceable relative to the second holding member (17; 57; 77) for clamping the plate-shaped element (5) therebetween;
 a fastening member (27; 60) extendable through the first holding member (12; 52; 72) and the second holding member (17; 57; 77) and connectable with an anchoring element (23) provided on the mounting rail (6) for securing the mounting device (11; 41; 51; 71) on the mounting rail (6); and
 at least one resilient element (32; 46; 62; 92) formed as an elastomeric body and provided between the first holding member (12; 52; 72) and the second holding member (17; 57; 77) for spacing the first and second holding members (12, 17; 52, 57; 72, 77) from each other,
 wherein at least one straight first guide web (14; 74) projects from a side (13) of the first holding member (12; 72) adjacent to the second holding member (17; 77), and at least one straight second guide web (19; 29) projects from a side (18; 78) of the second holding member (17;

77) adjacent to the first holding member (12; 72); and wherein the first and second guide webs (14, 19; 74, 79) overlap each other and extend in opposite directions toward each other in a parallel relationship, wherein the at least one resilient element (32; 46; 62; 92) is provided between a free end surface (75) of the at least one straight first guide web (14; 74) and the second holding member (17; 57; 77), wherein the first holding member includes a first flat gripping surface and the second holding member includes a second flat gripping surface for clamping the plate-shaped element (5) therebetween.

2. A mounting device according to claim 1, comprising at least one spacer (36; 62) provided between the first and second holding members (12, 17; 52, 57).

3. A mounting device according to claim 1, wherein a free edge (80) of at least one of the guide webs (79) forms a stop for limiting displacement of the first holding member (72) relative to the second holding member (77).

* * * * *